US012755102B2

(12) United States Patent
Baughman et al.

(10) Patent No.: US 12,755,102 B2
(45) Date of Patent: Oct. 6, 2026

(54) GENERATIVE ARTIFICIAL INTELLIGENCE COMMENTARY

(71) Applicant: International Business Machines Corporation, Armonk, NY (US)

(72) Inventors: Aaron K. Baughman, Cary, NC (US); Corey B. Shelton, Marietta, GA (US); Stephen C Hammer, Marietta, GA (US); Kavitha Hassan Yogaraj, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 187 days.

(21) Appl. No.: 18/602,154

(22) Filed: Mar. 12, 2024

(65) Prior Publication Data

US 2025/0292026 A1 Sep. 18, 2025

(51) Int. Cl.

*G06F 40/30* (2020.01)
*G06F 40/284* (2020.01)
*G06N 3/0475* (2023.01)

(52) U.S. Cl.

CPC ............ *G06F 40/30* (2020.01); *G06F 40/284* (2020.01); *G06N 3/0475* (2023.01)

(58) Field of Classification Search

CPC .... G06F 40/211; G06F 40/253; G06F 40/268; G06F 40/284; G06F 40/30; G10L 15/00; G06N 3/08

See application file for complete search history.

(56) References Cited

U.S. PATENT DOCUMENTS 10,943,407 B1 * 3/2021 Morgan ................ G06T 19/006
10,986,450 B2 4/2021 Dittberner
11,195,511 B2 * 12/2021 Hirvonen ................ G06F 3/167
11,537,792 B2 * 12/2022 Gao ...................... G06F 40/279
11,558,707 B2 1/2023 Schevciw et al.
11,620,320 B1 * 4/2023 Shukla .................... G06F 40/30 707/692

(Continued)

FOREIGN PATENT DOCUMENTS

CN 108200523 B 8/2021
JP 6055108 B2 12/2016

OTHER PUBLICATIONS

Wang et al., Binaural sound localization based on deep neural network and affinity propagation clustering in mismatched HRTF condition, Feb. 10, 2020.

(Continued)

*Primary Examiner* — Lamont M Spooner
(74) *Attorney, Agent, or Firm* — Michael A. Petrocelli

(57) ABSTRACT

An embodiment includes detecting by a neural network a text sequence, responsive to detecting the text sequence, computing an original sentiment of the detected text sequence. The embodiment includes computing by the neural network a predicted sentiment of a predicted text sequence wherein the predicted text sequence is predicted on the detected text sequence. The embodiment includes determining by the neural network a first matrix from a first encoder-decoder pair and second matrix from a second encoder-decoder pair based on the original sentiment and the predicted sentiment. The embodiment includes generating an output based on the first matrix and the second matrix.

17 Claims, 7 Drawing Sheets

(56) References Cited

U.S. PATENT DOCUMENTS

| | | | | |
|---|---|---|---|---|
| 11,750,997 | B2 | 9/2023 | Binn et al. | |
| 11,842,156 | B2 * | 12/2023 | Campos Ortega | G06F 40/103 |
| 11,978,273 | B1 * | 5/2024 | Ramaswamy | G06V 30/412 |
| 12,020,265 | B1 * | 6/2024 | Mao | G06F 40/30 |
| 12,321,701 | B2 * | 6/2025 | Anand | G06F 40/284 |
| 12,494,211 | B2 * | 12/2025 | Breebaart | G10L 19/008 |
| 2009/0240503 | A1 * | 9/2009 | Miyasaka | H04S 3/02<br>704/500 |
| 2010/0114582 | A1 * | 5/2010 | Beack | G10L 19/0017<br>704/500 |
| 2011/0264456 | A1 * | 10/2011 | Koppens | H04S 1/005<br>704/500 |
| 2011/0305345 | A1 * | 12/2011 | Bouchard | G10L 21/0208<br>704/226 |
| 2015/0271220 | A1 * | 9/2015 | Kleiner | G06Q 10/101<br>709/204 |
| 2015/0358539 | A1 * | 12/2015 | Catt | G06T 5/80<br>348/38 |
| 2019/0130463 | A1 * | 5/2019 | Bolla | G06Q 20/384 |
| 2019/0189259 | A1 * | 6/2019 | Clark | G16H 10/60 |
| 2019/0205775 | A1 * | 7/2019 | Baughman | G06F 16/90332 |
| 2019/0333078 | A1 * | 10/2019 | Bala | G06Q 40/06 |
| 2020/0004816 | A1 * | 1/2020 | Kieser | G06F 40/30 |
| 2020/0159829 | A1 * | 5/2020 | Zhao | G06F 40/30 |
| 2020/0210521 | A1 * | 7/2020 | Hutchins | G06F 40/221 |
| 2020/0258493 | A1 * | 8/2020 | Gauger, Jr. | G10K 11/17853 |
| 2020/0285696 | A1 * | 9/2020 | Stewart | G06F 16/906 |
| 2021/0049700 | A1 * | 2/2021 | Nguyen | G06N 3/09 |
| 2021/0272040 | A1 * | 9/2021 | Johnson | G10L 25/24 |
| 2021/0368222 | A1 * | 11/2021 | Stelmar Netto | H04N 21/8456 |
| 2022/0284450 | A1 * | 9/2022 | Asta | G06Q 40/04 |
| 2022/0319553 | A1 * | 10/2022 | Cheong | G11B 27/031 |
| 2022/0366145 | A1 * | 11/2022 | Hosseini-Asl | G06N 3/08 |
| 2022/0408147 | A1 * | 12/2022 | Howard | A61B 5/486 |
| 2023/0059697 | A1 | 2/2023 | Alford | |
| 2023/0111824 | A1 * | 4/2023 | Mukherjee | G06N 3/0464<br>704/200 |
| 2023/0116515 | A1 * | 4/2023 | Kanagovi | G06F 40/295<br>704/9 |
| 2023/0197106 | A1 * | 6/2023 | Alisamir | G10L 25/63<br>704/235 |
| 2023/0222314 | A1 | 7/2023 | Alford | |
| 2023/0297777 | A1 * | 9/2023 | Dimitriadis | G06F 40/30 |
| 2023/0335142 | A1 * | 10/2023 | Breebaart | G10L 19/008 |
| 2023/0351149 | A1 * | 11/2023 | Yu | G06N 3/04 |
| 2024/0037316 | A1 * | 2/2024 | Mohanty | G10L 13/00 |
| 2024/0040328 | A1 * | 2/2024 | Yokoyama | H04S 7/301 |
| 2024/0104305 | A1 * | 3/2024 | Glesinger | G06V 10/421 |
| 2024/0143136 | A1 * | 5/2024 | Mink | G06F 3/0484 |
| 2024/0143915 | A1 * | 5/2024 | Gupta | G06F 40/30 |
| 2024/0160847 | A1 * | 5/2024 | Jayakrishnasamy | G06F 40/30 |
| 2024/0169160 | A1 * | 5/2024 | Ein-Dor | G06F 40/40 |
| 2024/0244391 | A1 * | 7/2024 | Koppens | H04S 7/30 |
| 2024/0265043 | A1 * | 8/2024 | Lytle | G06F 40/42 |
| 2024/0265047 | A1 * | 8/2024 | McCarson | G06F 18/217 |
| 2024/0273793 | A1 * | 8/2024 | DeCharms | G06F 40/109 |
| 2024/0361827 | A1 * | 10/2024 | McNulty | G10L 25/63 |
| 2024/0378427 | A1 * | 11/2024 | Petrov | G06N 3/0475 |
| 2025/0095008 | A1 * | 3/2025 | Moghaddam | G06N 3/094 |
| 2025/0200663 | A1 * | 6/2025 | Pathak | G06F 40/30 |
| 2025/0232120 | A1 * | 7/2025 | Coffrant | G06N 3/0455 |
| 2025/0272707 | A1 * | 8/2025 | Zhou | G06Q 30/0206 |
| 2025/0307927 | A1 * | 10/2025 | Galvin | G06N 3/045 |

OTHER PUBLICATIONS

Benaroya et al., Binaural Localization of Multiple Sound Sources by Non-Negative Tensor Factorization, IEEE/ACM Transactions on Audio, Speech, and Language Processing, vol. 26, No. 6, Jun. 2018.
Yang et al., Learning Deep Direct-Path Relative Transfer Function for Binaural Sound Source Localization, Feb. 16, 2022.
Parida et al., Beyond Mono to Binaural: Generating Binaural Audio from Mono Audio with Depth and Cross Modal Attention, 2022 IEEE/CVF Winter Conference on Applications of Computer Vision (WACV), 2022.
Qian et al., Binaural Sound Source Localization based on Neural Networks in Mismatched HRTF Condition, ICCAI '22: Proceedings of the 8th International Conference on Computing and Artificial Intelligence, pp. 62-67, Mar. 18-21, 2022.
Shon et al., Leveraging Pre-Trained Language Model for Speech Sentiment Analysis, Aug. 30-Sep. 3, 2021.
Botha, The Retention of Evoked Meaning in Literary Translation: Translating Dialect and Register in the Long Journey of Poppie Nongena by Elsa Joubert, Mar. 2015.
ip.com, Contextually Embellished Translation, Dec. 4, 2023.
ip.com, Cognitive Accent Modulator for Global Teleconference, Jul. 13, 2022.
ip.com, A System to Enhance Real-time Speech to Text Transcription Through Visual and Contextual Inputs, Aug. 31, 2021.
ip.com, Cognitive Recording Analyzer, Jul. 2, 2020.
No Author, "Natural Language Processing (NLP) Market Size, Share & COVID-19 Impact Analysis", Fortune Business Insights, Report ID: FBI101933, May 2023, 10 pages, doi: https://web.archive.org/web/20240121032057/https://www.fortunebusinessinsights.com/industry-reports/natural-language-processing-nlp-market-101933.

* cited by examiner

GENERATIVE ARTIFICIAL INTELLIGENCE COMMENTARY

BACKGROUND

The present invention relates generally to artificial intelligence. More particularly, the present invention relates to a method, system, and computer program for A Generative Artificial Intelligence Commentary.

Complex machine learning models such as deep neural networks (DNNs) or large ensembles of models have become increasingly popular due to their state-of-the-art performance across multiple prediction tasks. Generative artificial intelligence is used to generate text, video, images, and sound in rapidly maturing and making a real impact. Generative AI models use neural networks to identify the patterns and structures within existing data to generate new and original content.

SUMMARY

The illustrative embodiments provide for A Generative Artificial Intelligence Commentary. An embodiment includes detecting by a neural network a text sequence, responsive to detecting the text sequence, computing an original sentiment of the detected text sequence. The embodiment includes computing by the neural network a predicted sentiment of a predicted text sequence wherein the predicted text sequence is predicted on the detected text sequence. The embodiment includes determining by the neural network a first matrix from a first encoder-decoder pair and second matrix from a second encoder-decoder pair based on the original sentiment and the predicted sentiment. The embodiment includes generating an output based on the first binaural matrix and the second binaural matrix.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of the illustrative embodiments when read in conjunction with the accompanying drawings, wherein:

DETAILED DESCRIPTION

Figure 1:
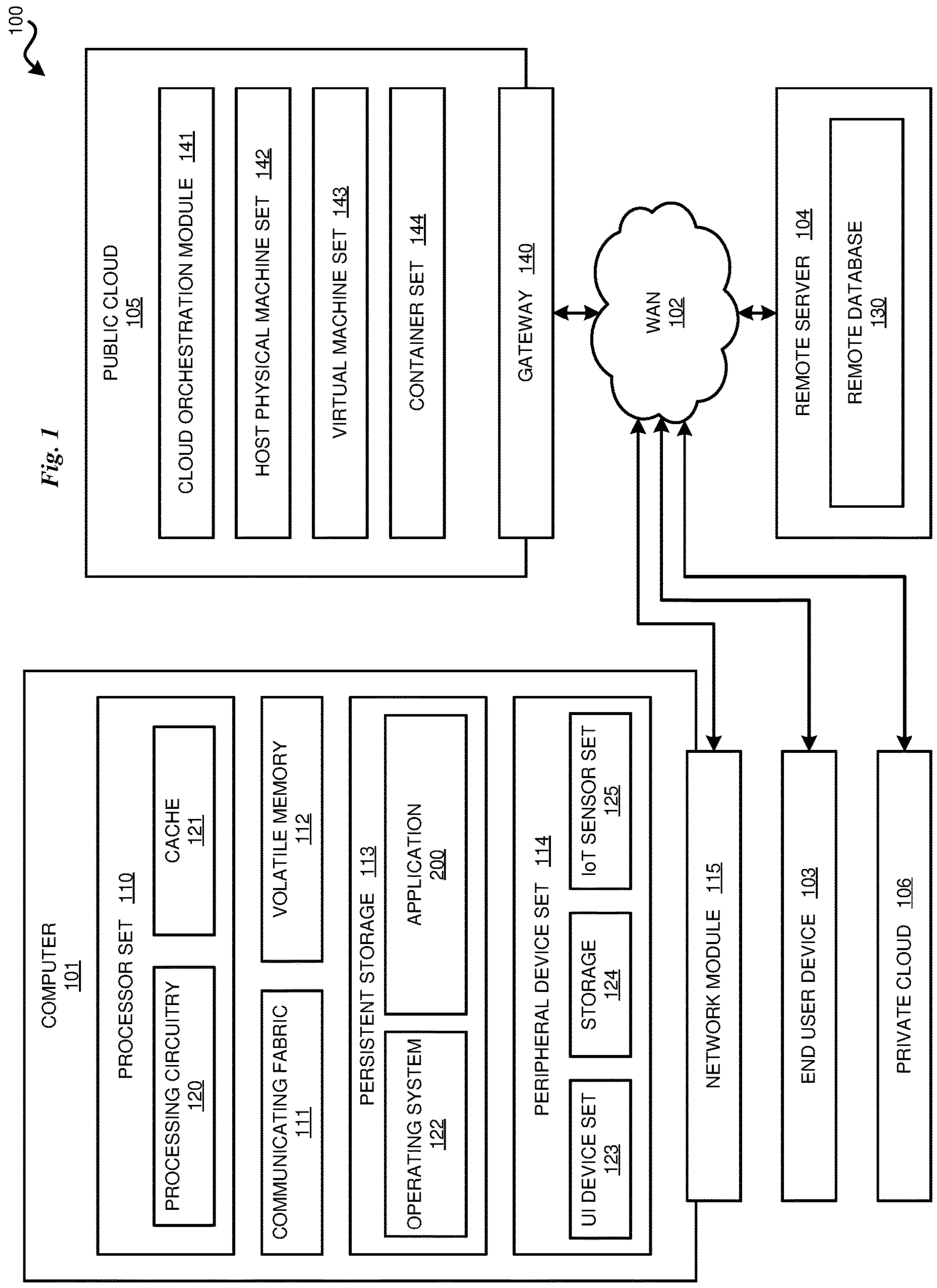
FIG. 1 depicts a block diagram of a computing environment in accordance with an illustrative embodiment.

Complex machine learning models such as deep neural networks (DNNs) or large ensembles of models have become increasingly popular due to their state-of-the-art performance across multiple prediction tasks. Generative artificial intelligence is used to generate text, video, images, and sound in rapidly maturing and making a real impact. Generative AI models use neural networks to identify the patterns and structures within existing data to generate new and original content.

The present disclosure provides a method, a machine-readable medium, and a system for A Generative Artificial Intelligence Commentary. An embodiment includes detecting by a neural network a text sequence, responsive to detecting the text sequence, computing an original sentiment of the detected text sequence. The embodiment includes computing by the neural network a predicted sentiment of a predicted text sequence wherein the predicted text sequence is predicted on the detected text sequence. The embodiment includes determining by the neural network a first matrix from a first encoder-decoder pair and second matrix from a second encoder-decoder pair based on the original sentiment and the predicted sentiment. The embodiment includes generating a output based on the first matrix and the second matrix.

Illustrative embodiments include further comprising fine-tuning the binaural output by a generative adversarial network based on the original sentiment and a provided sentiment wherein the provided sentiment is computed from a prosody metric of the detected text sequence.

Illustrative embodiments include further comprising modifying a differential of a frequency between a left output of the binaural output and a right output of the binaural output.

Illustrative embodiments include wherein the prosody metric of the detected text sequence comprises a histogram of the detected text sequence.

Illustrative embodiments include wherein computing by the neural network a predicted sentiment comprises a Bidirectional Encoder Representations from Transformers model.

Illustrative embodiments include wherein a selection of the first encoder-decoder pair and the second encoder-decoder pair is based on an optimization of the detected text sequence and the predicted text sequence.

Illustrative embodiments also include further comprising synchronizing the binaural output with a video input.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or components that are not shown or described herein, or structures or components different from those shown but for a similar function as described herein may be present without departing the scope of the illustrative embodiments.

Furthermore, the illustrative embodiments are described with respect to specific actual or hypothetical components only as examples. Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, computer readable storage media, high-level features, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

With reference to FIG. 1, this figure depicts a block diagram of a computing environment 100. Data center environment 100 contains an example of an environment for the execution of at least some of the computer code involved in performing the inventive methods, such as an Application module 200 that provides A Generative Artificial Intelligence Commentary. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 012 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

CLOUD COMPUTING SERVICES AND/OR MICROSERVICES (not separately shown in FIG. 1): private and public clouds 106 are programmed and configured to deliver cloud computing services and/or microservices (unless otherwise indicated, the word "microservices" shall be interpreted as inclusive of larger "services" regardless of size). Cloud services are infrastructure, platforms, or software that are typically hosted by third-party providers and made. available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

Figure 2:
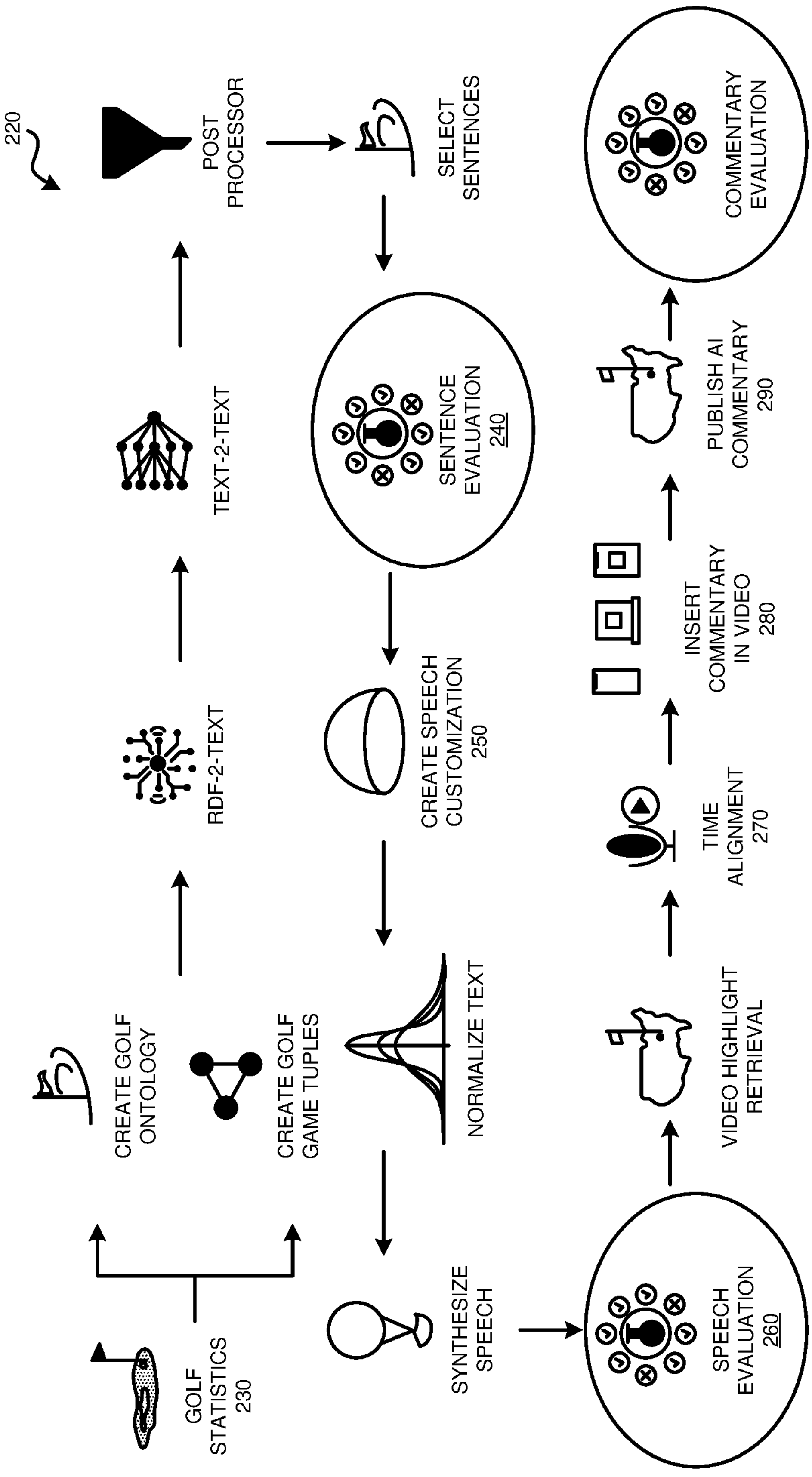
FIG. 2 depicts a diagram of A Generative Artificial Commentary in an environment in accordance with an illustrative embodiment.

FIG. 2 depicts a diagram of A Generative Artificial Intelligence Commentary in an environment in accordance with an illustrative embodiment. In a particular embodiment, the diagram 220 shows aspects of the application 200 of FIG. 1.

In the illustrated embodiment, golf statistics 230 are input into the neural network system text is generated and sentence evaluation 240 is performed. Create speech customization 250 is performed, speech is synthesized and speech evaluation 260 is performed. The speech is synchronized with a video input comprising time alignment 270 and insert commentary in the video 280 to generate and publish AI commentary 290. The commentary evaluation is performed.

In embodiments, the neural network may be a computational system including a large collection of simple neural units or processing elements (PEs) interconnected together. This may comprise processor nodes and connections between them, each node and connection performing computations, wherein the behavior of the nodes and connections is described by parameter values which either may be fixed or may be modifiable according to a specified learning or update rule. The local processing circuitry may include static random-access memory (SRAM), Direct memory access (DMA) and a central processing unit. In various embodiments, the CPU may include various types of computational processing units such as graphics processing units (GPUs), microcontrollers, or similar.

In embodiments, a binaural sound, two different frequencies are required to be emitted into separate ears. The difference between the frequencies causes a neuronal neuron spike that stimulates the brain. This causes an induced feeling or release of serotonin.

Figure 3:
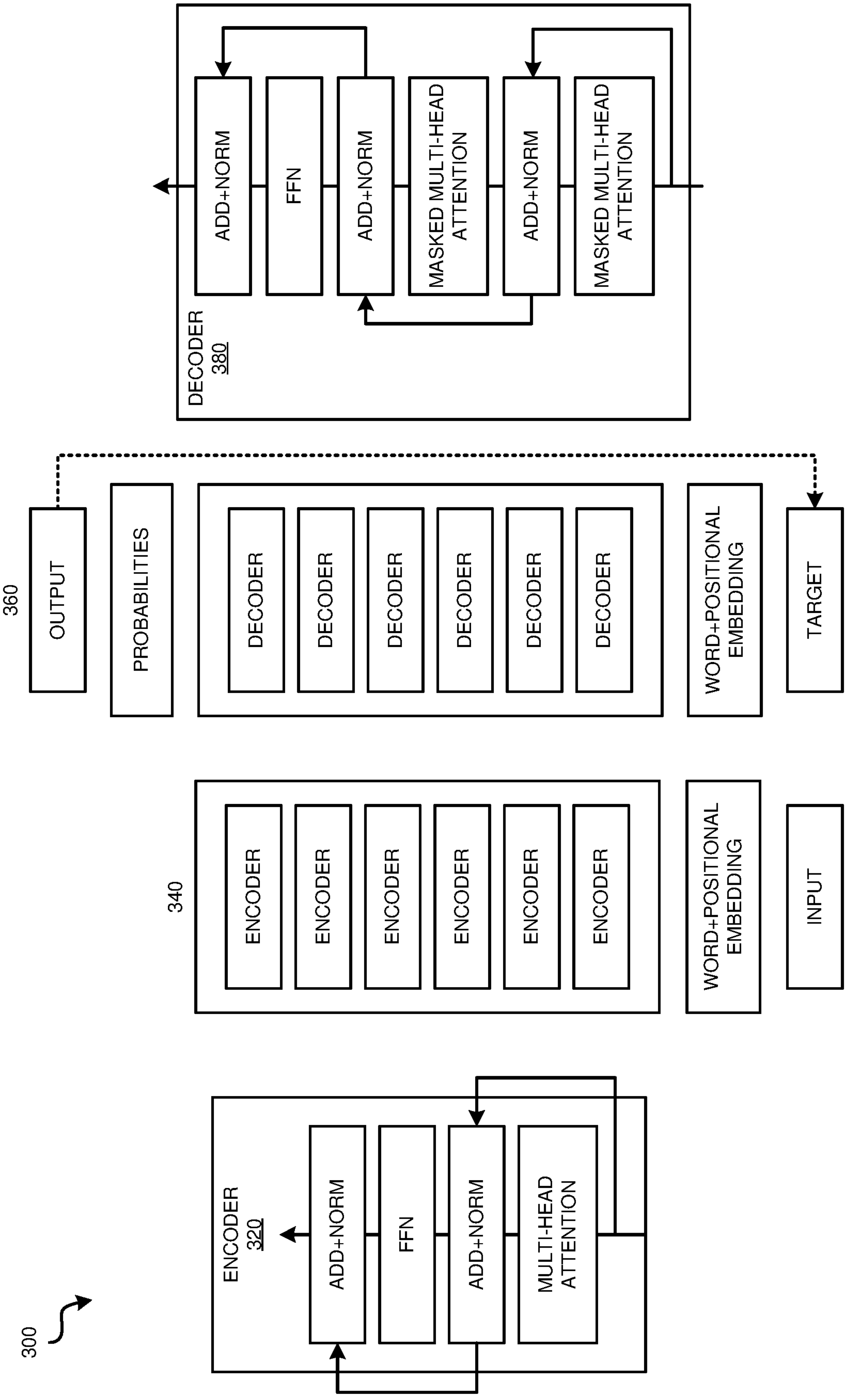
FIG. 3 depicts a diagram of an encoder-decoder pair of the neural network in accordance with an illustrative embodiment.

FIG. 3 depicts a diagram of an encoder-decoder pair of the neural network in accordance with an illustrative embodiment. In a particular embodiment, the components of the diagram 300 shows aspects of the application 200 of FIG. 1.

In the illustrated embodiment, an encoder 320 is one of many encoders in the stack 340, a decoder 380 is one of many decoders in the stack 360. Within each of these nodes, a feedforward neural network (FNN) is present. The selected output of the 2nd to last layer output is used as the initial binaural seed. Next, the selected output of a further downstream encoder or decoder FNN is selected. The 2nd to last layer's output is used as the closing binaural sound differential.

Figure 4:
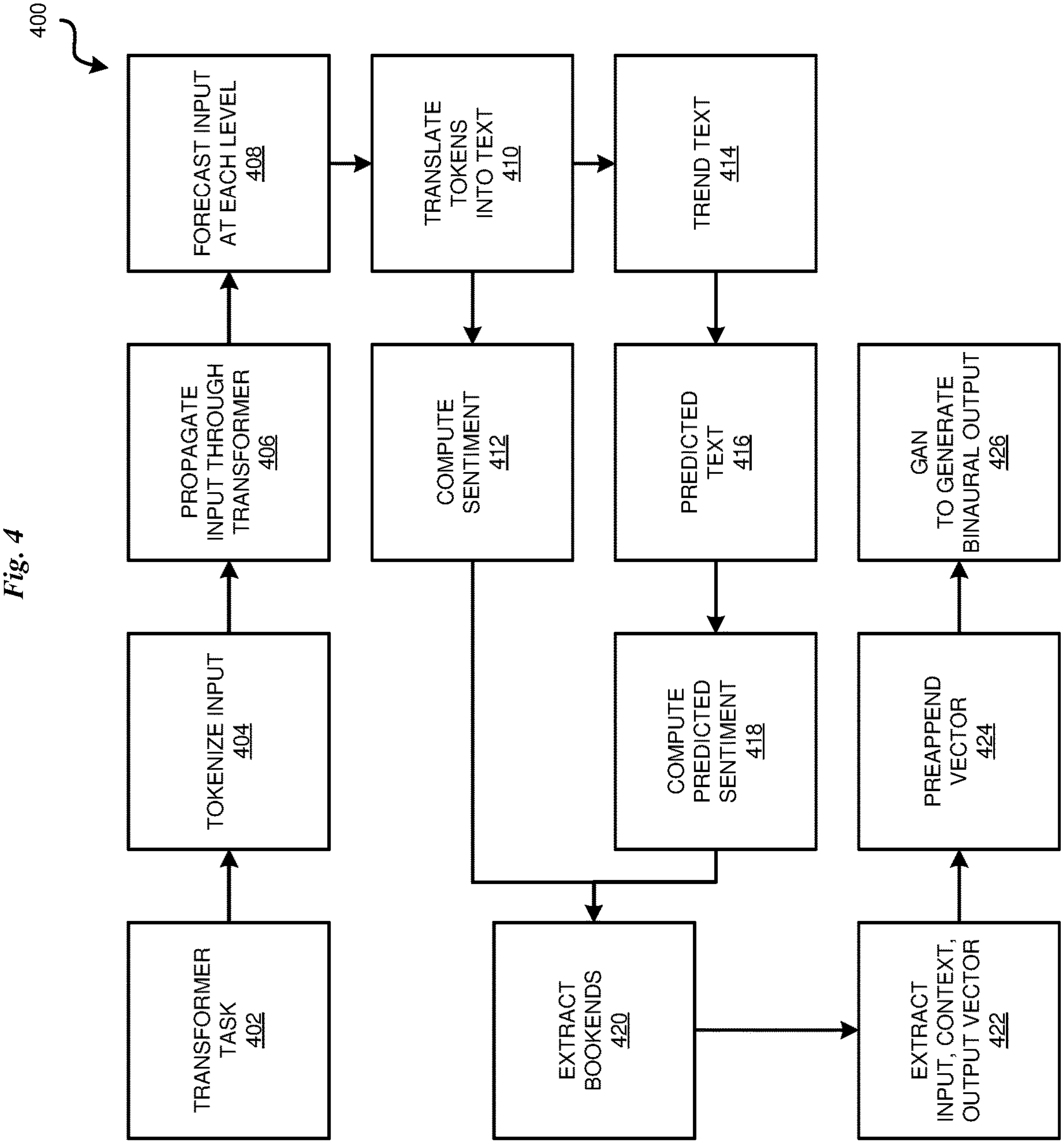
FIG. 4 depicts flowchart diagram in accordance with an illustrative embodiment.

FIG. 4 depicts a flowchart diagram in accordance with an illustrative embodiment. In a particular embodiment, the components 400 are representative of aspects of the application 200 of FIG. 1.

In the illustrated embodiment, the flow chart starts with a detection by a neural network of a text sequence input. In embodiments, the text sequence may be commentary generated by an artificial intelligence system. Responsive to detecting the text sequence, the transformer task 402 tokenizes the input 404 detected text sequence, and propagates the input through the transformer 406 including the encoders and decoders. At each level of the transformer, the forecast of the input is performed 408, and tokens translated into text 410. Next, the sentiment is computed from the text 412, for example using a Bidirectional Encoder Representations from Transformers (BERT) model. The text may further be processed into a trend text 414, and natural language processing may be performed to generate a predicted text sequence 416 predicted on the input detected text sequence. In embodiments, the prediction may comprise masked language modeling (MLM) and next sentence prediction (NSP). Next, the predicted sentiment is computed 418.

In embodiments, the change in sentiment over time indicates how much the source feed is changing irrespective of transformation. This is referred to as the input forecasted value. The decoder output sentiment is also forecasted. The difference between the input and output sentiment is referred to as the output forecasted value. A linear optimization process that minimizes the level differences between encoders, decoders, and encoder/decoder is performed.

In some embodiments, the restriction bounds such as the maximizing a selection of paired FNN levels while maximizing the differences of forecasted and current values sets up a multi-objective optimization problem.

$$\Delta fencoding_i = |\text{sent}(f(\overline{x}_{1,in})) - \text{sent}(f(\overline{x}_{1,in}))|$$

$$\Delta fdecoding_i = |\text{sent}(f(\overline{x}_{2,in})) - \text{sent}(f(\overline{x}_{2,in}))|$$

$$\Delta fdecodeencode_i = |\Delta fencoding_i - \Delta fdecoding_i|$$

$$\Delta \text{encoding}_i = |\text{sent}(\overline{x}_{1,in}) - \text{sent}(\overline{x}_{1.out})|$$

$$\Delta \text{decoding}_i = |\text{sent}(\overline{x}_{2,in}) - \text{sent}(\overline{x}_{2,out})|$$

$$\Delta decodeencode_i = |\Delta \text{encoding}_i - \Delta \text{decoding}_i|$$

-continued $\overline{x}_{1,in}$ = the input of the first encoder $\overline{x}_{2,in}$ = the input of the first decoder $\overline{x}_{1,out}$ = the output of the first encoder $\overline{x}_{2,out}$ = the output of the first decoder Each of the delta scores generate pairs of NN nodes scores. The output of each neural network or input is translated into tokens and then into a respective language. This enables the sentiment of the text to be measured by a BERT sentiment model. The delta f's refer to forecasted values while the delta d's refer to the current data.

In some embodiments, the optimization algorithm has two numbers that measure the change in sentiment based forecasted or standard inputs. The sum of the differences produces the number to maximize while the distance between the levels should be minimized. The output of the linear optimizer is a selection of two levels within the transformer that may be a pair of encoders, decoders, or encoder and decoder.

In embodiments, the selected output of the second to last layer output is the first binaural matrix which may be an initial binaural seed. Next, the selected output of a further downstream encoder or decoder FNN is selected. The second to last layer's output is the second binaural matrix comprising a closing binaural sound differential. The selected input tokens, context, and attention for the encoder along with the output of the second to last layer in the FNN is extracted for the pair of bookends 420. Next, the input, context and output vector are extracted 422, and pre-appended to the vector 424. The vector is input into a generative adversarial network (GAN) to generate a binaural output (a pair of sounds; one for each ear) based on the first binaural matrix and the second binaural matrix 426.

In some embodiments, the binaural output is fine-tuned based on the prosody. In linguistics, prosody is the study of elements of speech that are not individual phonetic segments (vowels and consonants) but which are properties of syllables and larger units of speech, including linguistic functions such as intonation, stress, and rhythm. The prosody of speech can also change between cultures. For example, within Japanese, the language could have a syllable rate of 7.84 per seconds. However, Mandarin is one of the slowest languages. In embodiments, the prosody changes made by AI commentary may not match the language feature set.

Figure 5:
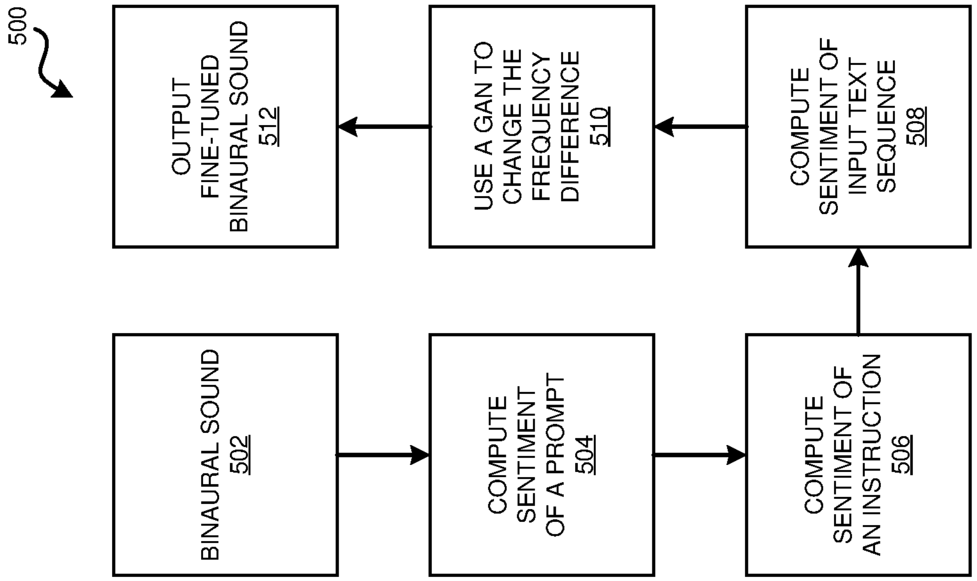
FIG. 5 depicts flowchart diagram in accordance with an illustrative embodiment.

FIG. 5 depicts a flowchart diagram in accordance with an illustrative embodiment. In a particular embodiment, the system components 500 are representative of aspects of the application 200 of FIG. 1.

In the illustrated embodiment, the binaural output is finetuned by a generative adversarial network based on the original sentiment and a provided sentiment wherein the provided sentiment is computed from a prosody metric of the detected text sequence. The binaural output 502, together with a provided sentiment, for example the computed sentiment of a prompt 504 and/or the computed sentiment of an instruction 506, and the original sentiment computed from the detected input text sequence 508 are inputted into a GAN. In embodiments, the provided sentiment is computed from prosody metric of the detected text sequence such as from a histogram of the text. The GAN changes the frequency difference 510 and outputs a finetuned binaural sound 512.

When two tones of slightly different frequencies are played in separate ears simultaneously (usually through headphones), the human brain perceives the creation of a new, third tone, whose frequency is equivalent to the difference between the two tones being played. This auditory illusion is called a binaural beat. Binaural beats in the delta (1 to 4 Hz) range have been associated with deep sleep and relaxation. Binaural beats in the theta (4 to 8 Hz) range are linked to REM sleep, reduced anxiety, relaxation, as well as meditative and creative states. Binaural beats in the alpha frequencies (8 to 13 Hz) are thought to encourage relaxation, promote positivity, and decrease anxiety. Binaural beats in the lower beta frequencies (14 to 30 Hz) have been linked to increased concentration and alertness, problem-solving, and improved memory. Binaural beats of 40 Hz were found to be helpful in enhancing training and learning.

Figure 6:
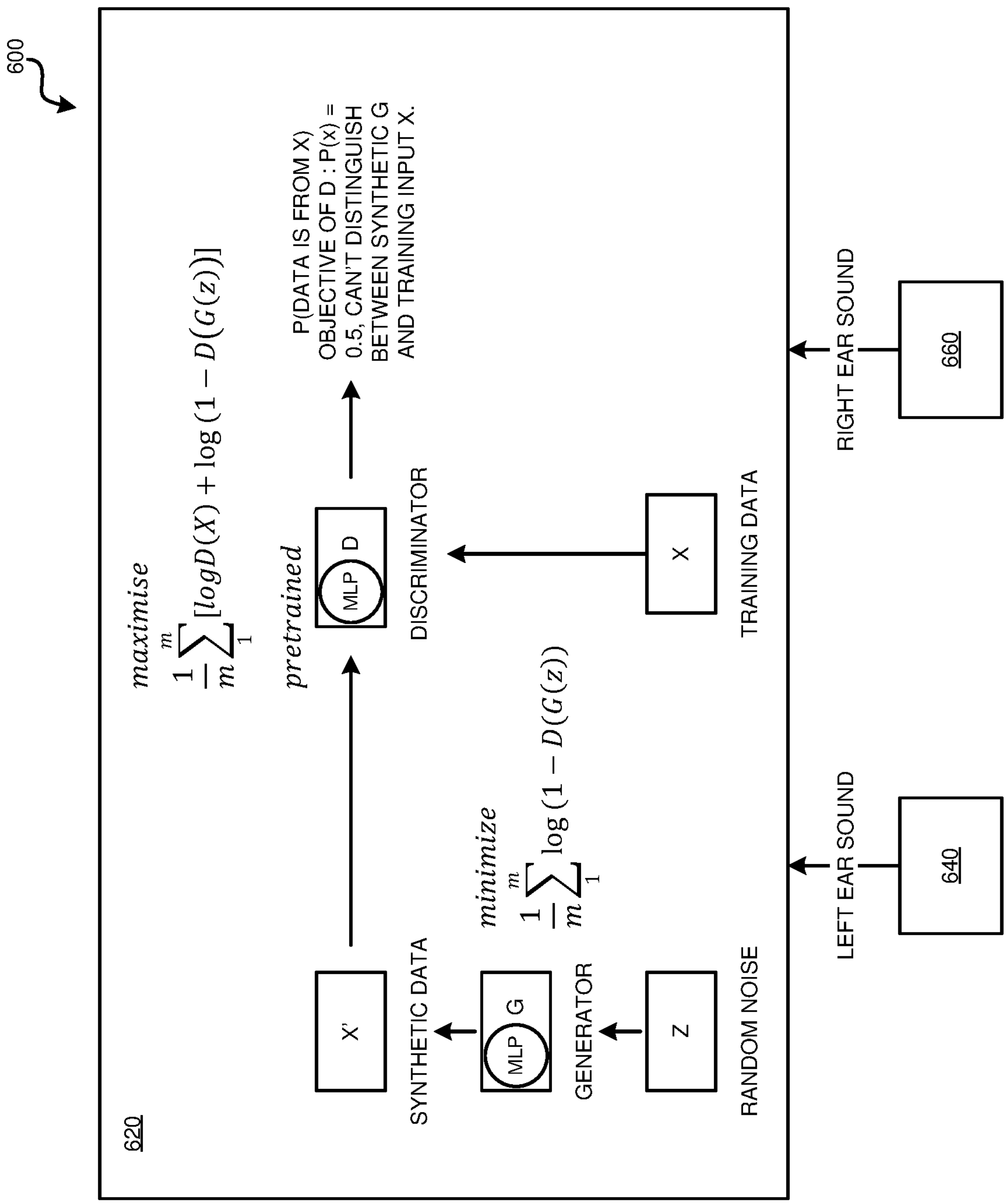
FIG. 6 depicts a diagram in accordance with an illustrative embodiment.

FIG. 6 depicts a diagram in accordance with an illustrative embodiment. In a particular embodiment, the system components 600 are representative of aspects of the application 200 of FIG. 1.

In the illustrated embodiment, the GAN 620 receives the left ear sound 640 and the right ear sound 660. In some embodiments, the D function gives the probability that the given sample is from training data X. For the Generator, the function log (1−D(G(z)) is minimized i.e. when the value of D(G(z)) is high then D will assume that G(z) is anything but X and this makes 1−D(G(z)) low and minimizing it makes this even lower. For the Discriminator, maximize the D(X) and (1−D(G(z))) functions such that the optimal state of D will be P(x)=0.5. Train the generator G such that it will produce the results for the discriminator D such that D will not be able to distinguish between z and X.

In embodiments, the binaural output is further finetuned with binaural beats comprising modifying a differential of frequency between a left output of the binaural output and a right output of the binaural output. The variance between iterations of the Generator is computed. In some embodiments, the variance is related to the differences between frequencies of the generated binaural beats.

$$u_{fr} = \frac{1}{g}\sum_{g=1}^{G}|f_r - f_l|$$

$$\sigma^2_{fr} = \frac{1}{g}\sum_{g=1}^{G}((|f_r - f_l|) - u_{fr})^2$$

The generator minimization becomes:

$$\frac{1}{m}\sum_{1}^{m}\log\left(1 - D(G(z)) + 1 - \tan h\left(\sigma^2_{fr}\right)\right)$$

Figure 7:
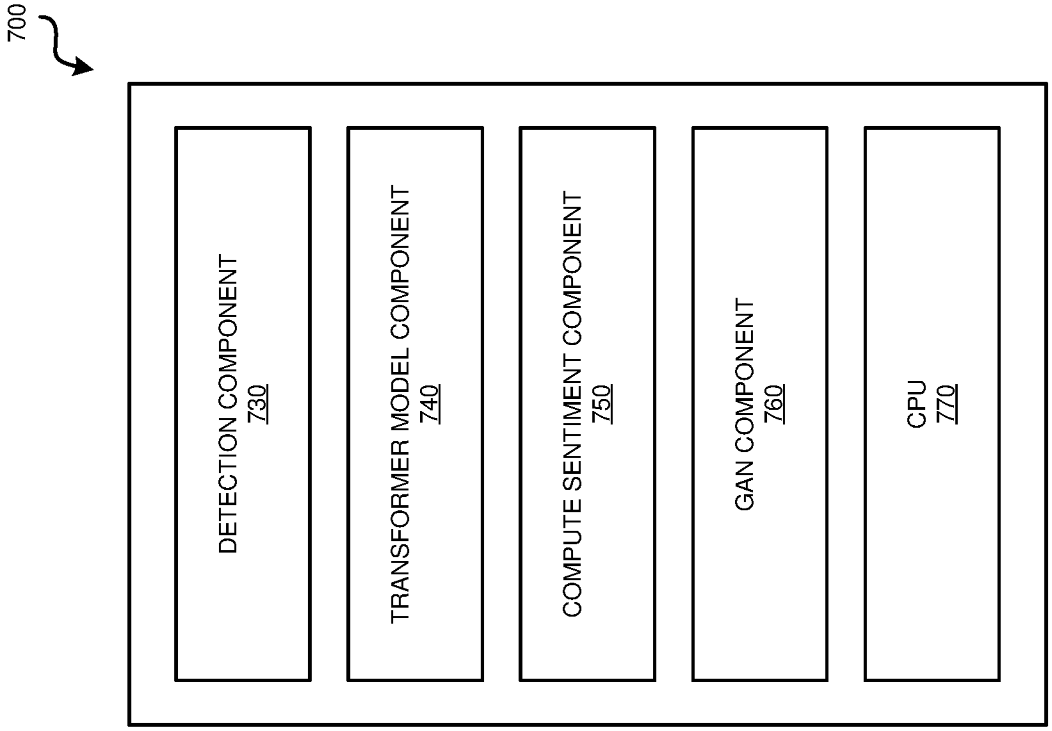
FIG. 7 depicts a system diagram in accordance with an illustrative embodiment.

FIG. 7 depicts a system diagram in accordance with an illustrative embodiment. In a particular embodiment, the system components 700 are representative of aspects of the application 200 of FIG. 1.

In the illustrated embodiment, the Detection component 730 of a neural network system detects a text sequence. A Transformer component 740 interacts with the Compute Sentiment component 750 and a GAN component 760. A central processing unit (CPU) 770 performs operations on the various components. In embodiments, the operations of computing by the neural network may involve accelerating processing by optimizing GPU/CPU interaction including processor nodes and connections.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer-implemented method comprising:

detecting by a neural network a text sequence, responsive to detecting the text sequence, computing an original sentiment of the detected text sequence;

computing by the neural network a predicted sentiment of a predicted text sequence wherein the predicted text sequence is predicted on the detected text sequence;

determining by the neural network a first matrix from a first encoder-decoder pair and second matrix from a second encoder-decoder pair based on the original sentiment and the predicted sentiment;

generating a binaural output based on the first matrix and the second matrix; and finetuning the binaural output by a generative adversarial network based on the original sentiment and a provided sentiment wherein the provided sentiment is computed from a prosody metric of the detected text sequence.

2. The computer-implemented method of claim 1, further comprising modifying a differential of a frequency between a left output of the binaural output and a right output of the binaural output.

3. The computer-implemented method of claim 1, wherein the prosody metric of the detected text sequence comprises a histogram of the detected text sequence.

4. The computer-implemented method of claim 1, wherein computing by the neural network a predicted sentiment comprises a Bidirectional Encoder Representations from Transformers model.

5. The computer-implemented method of claim 1, wherein a selection of the first encoder-decoder pair and the second encoder-decoder pair is based on an optimization of the detected text sequence and the predicted text sequence.

6. The computer-implemented method of claim 5, further comprising synchronizing the binaural output with a video input.

7. A computer program product comprising one or more computer readable storage media, and program instructions collectively stored on the one or more computer readable storage media, the program instructions executable by a processor to cause the processor to perform operations comprising:

detecting by a neural network a text sequence, responsive to detecting the text sequence, computing an original sentiment of the detected text sequence;

computing by the neural network a predicted sentiment of a predicted text sequence wherein the predicted text sequence is predicted on the detected text sequence;

determining by the neural network a first matrix from a first encoder-decoder pair and second matrix from a second encoder-decoder pair based on the original sentiment and the predicted sentiment;

generating a binaural output based on the first matrix and the second matrix; and finetuning the binaural output by a generative adversarial network based on the original sentiment and a provided sentiment wherein the provided sentiment is computed from a prosody metric of the detected text sequence.

8. The computer program product of claim 7, further comprising modifying a differential of a frequency between a left output of the output and a right output of the output.

9. The computer program product of claim 7, wherein the prosody metric of the detected text sequence comprises a histogram of the detected text sequence.

10. The computer program product of claim 7, wherein computing by the neural network a predicted sentiment comprises a Bidirectional Encoder Representations from Transformers model.

11. The computer program product of claim 7, wherein a selection of the first encoder-decoder pair and the second encoder-decoder pair is based on an optimization of the detected text sequence and the predicted text sequence.

12. The computer program product of claim 11, further comprising synchronizing the output with a video input.

13. A computer system comprising a processor and one or more computer readable storage media, and program instructions collectively stored on the one or more computer readable storage media, the program instructions executable by the processor to cause the processor to perform operations comprising:

detecting by a neural network a text sequence, responsive to detecting the text sequence, computing an original sentiment of the detected text sequence;

computing by the neural network a predicted sentiment of a predicted text sequence wherein the predicted text sequence is predicted on the detected text sequence;

determining by the neural network a first matrix from a first encoder-decoder pair and second matrix from a second encoder-decoder pair based on the original sentiment and the predicted sentiment;

generating a binaural output based on the first matrix and the second matrix; and finetuning the binaural output by a generative adversarial network based on the original sentiment and a provided sentiment wherein the provided sentiment is computed from a prosody metric of the detected text sequence.

14. The computer system of claim 13, further comprising modifying a differential of a frequency between a left output of the output and a right output of the output.

15. The computer system of claim 13, wherein the prosody metric of the detected text sequence comprises a histogram of the detected text sequence.

16. The computer system of claim 13, wherein a selection of the first encoder-decoder pair and the second encoder-decoder pair is based on an optimization of the detected text sequence and the predicted text sequence.

17. The computer system of claim 16, further comprising synchronizing the output with a video input.

* * * * *